United States Patent [19]

Widener et al.

[11] Patent Number: 4,966,745
[45] Date of Patent: Oct. 30, 1990

[54] FUEL ROD GRIPPER END CAP FOR MINIMIZING IMPACT WITH GRID CELL DIMPLES

[75] Inventors: Wade H. Widener; David A. Boatwright, both of Columbia, S.C.

[73] Assignee: Westinghouse Electric Company

[21] Appl. No.: 372,482

[22] Filed: Jun. 28, 1989

[51] Int. Cl.$^5$ .............................................. G21C 19/00
[52] U.S. Cl. ..................... 376/264; 376/268; 376/451; 294/86.28
[58] Field of Search ............... 376/409, 451, 453, 264, 376/268; 294/86.28, 86.32

[56] References Cited

U.S. PATENT DOCUMENTS

| | | | |
|---|---|---|---|
| 3,698,756 | 10/1972 | Groves | 294/96 |
| 4,236,967 | 12/1980 | Batjukov et al. | 176/30 |
| 4,297,776 | 11/1981 | Fogg | 29/252 |
| 4,571,802 | 2/1986 | Calhoun et al. | 29/157.3 |
| 4,639,998 | 2/1987 | Shallenberger | 29/426.5 |
| 4,684,499 | 8/1987 | Gjertsen | 376/446 |
| 4,716,018 | 12/1987 | Boatwright | 376/451 |
| 4,740,351 | 4/1988 | Katsumizu | 376/446 |
| 4,747,997 | 5/1988 | Boatwright | 376/261 |
| 4,800,061 | 1/1989 | Shallenberger | 376/261 |

Primary Examiner—Donald P. Walsh

[57] ABSTRACT

An end cap is mounted on a fuel rod gripper to cover the end portions of fingers thereon to minimize impacts with grid cell dimples. The fingers are defined by circumferentially-spaced and longitudinally-extending slots in the gripper which permit the finger end portions to radially expand and retract between corresponding expanded and collapsed conditions. The end cap includes a body having a forward camming portion and a rearward mounting portion. The rearward mounting portion is hollow and configured to fit over and cover the end portions of the gripper fingers with the forward camming portion extending forwardly thereof. Also, circumferentially-spaced and longitudinally-extending attachment flutes are dispsoed internally of the hollow mounting portion of the body and project radially inwardly therefrom. The flutes are configured to releasably fit within the respective slots of the gripper when the finger end portions thereof are in the expanded condition and to be retained therein when the finger end portions are in the retracted condition.

8 Claims, 3 Drawing Sheets

FUEL ROD GRIPPER END CAP FOR MINIMIZING IMPACT WITH GRID CELL DIMPLES

BACKGROUND OF THE INVENTION

1. Field of the Invention

The present invention relates generally to loading nuclear fuel rods into a fuel assembly skeleton and, more particularly, is concerned with an end cap for a fuel rod gripper of a fuel rod loader which minimizes impacts with grid cell dimples during fuel rod loading operations.

2. Description of the Prior Art

In a typical nuclear reactor, the reactor core includes a large number of elongated fuel assemblies. Conventional designs of these fuel assemblies include top and bottom nozzles with a plurality of elongated transversely spaced guide thimbles extending longitudinally between and connected at opposite ends to the nozzles and a plurality of transverse support grids axially spaced along the guide thimbles. Also, each fuel assembly is composed of a multiplicity of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

In assembling a fuel assembly, it has been conventional practice, first, to attach the transverse grids to the longitudinally extending guide thimbles at predetermined axially spaced locations therealong to provide a fuel assembly skeleton. Next, the fuel rods are loaded by passing them through the cells of the grids. Typically, a fuel rod loader is used which pulls the fuel rods into the fuel assembly skeleton, passing them through the grid cells. The loader has a rod gripper which is, first, inserted through the grid cells, next, coupled to the end plug of a fuel rod, and, lastly, withdrawn back through the grids, pulling the attached fuel rod into the grids. After all fuel rods have been loaded by repeating these operations of the gripper, the bottom and top nozzles are then attached to the lower and upper ends of the guide thimbles to complete the fuel assembly.

One fuel rod gripper currently in use is disclosed in U.S. Pat. No. 4,747,997 to D. A. Boatwright. The gripper has a plurality of fingers with end portions which couple with the end plug of a fuel rod. For achieving coupling between the end plug and the gripper, the design of the end plug dictates that the overall configuration of the gripper finger end portions be relatively blunt. Occasionally, when the fuel rod gripper is initially passed through the fuel assembly before coupling with a fuel rod, the leading end portions of the gripper impact a dimple extending into one of the grid cells. The force of the impact due to the blunt configuration of the gripper end portions can be sufficient to cause deformation or cocking of the impacted dimple such that the dimple will not have the desired positional and supporting relationship to the fuel rod once the latter is loaded through the particular grid cell.

Consequently, there is a need for a way to avoid the deleterious effects of impact by the fuel rod gripper with the grid cell dimples when inserting the gripper through the fuel assembly skeleton.

SUMMARY OF THE INVENTION

The present invention provides a fuel rod gripper end cap designed to satisfy the aforementioned needs. Underlying the present invention is the realization that a solution to the problem of impact with the grid cell dimple need not seek to eliminate the impact entirely. Instead, in arriving at the solution of the present invention, the inventor herein perceived that the force of the impact need only be minimized and that such could be accomplished by the design of an appropriate end cap for covering the blunt end portions of the fuel rod gripper fingers during the initial insertion of the gripper through the grid cells. Once the gripper has been inserted through the cells, the end cap is then removed for coupling of its finger end portions to the fuel rod end plug in preparation for pulling the fuel rod into the fuel assembly.

Accordingly, the present invention is directed to a fuel rod gripper end cap which comprises: (a) a body having a longitudinal axis and a forward camming portion and a rearward mounting portion disposed in tandem relation along the axis; and (b) a plurality of attachment flutes disposed internally of the mounting portion of the body and projecting radially inwardly therefrom toward the longitudinal axis of the body. The forward portion of the end cap is solid and has a tapered configuration with rounded front end. The rearward portion of the end cap is hollow and has a cylindrical configuration. Further, the rearward mounting portion has a central counterbore formed therein closed at its forward end and open at its rear end. The flutes are attachedly mounted at their outer edges in respective circumferentially-spaced and longitudinally-extending channels formed in the mounting portion of the end cap body. Preferably, the flutes are three in number and disposed approximately 120 degrees from one another.

Also, the mounting portion of the end cap body is configured to fit over and cover the end portions of fingers of the fuel rod gripper with the forward camming portion extending forwardly thereof. The attachment flutes are disposed internally of the hollow mounting portion of the end cap body and project radially inwardly therefrom. The flutes are configured to releasably fit within respective slots of the fuel rod gripper when the finger end portions thereof are in an expanded condition and to be retained therein when the finger end portions are in a retracted condition.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
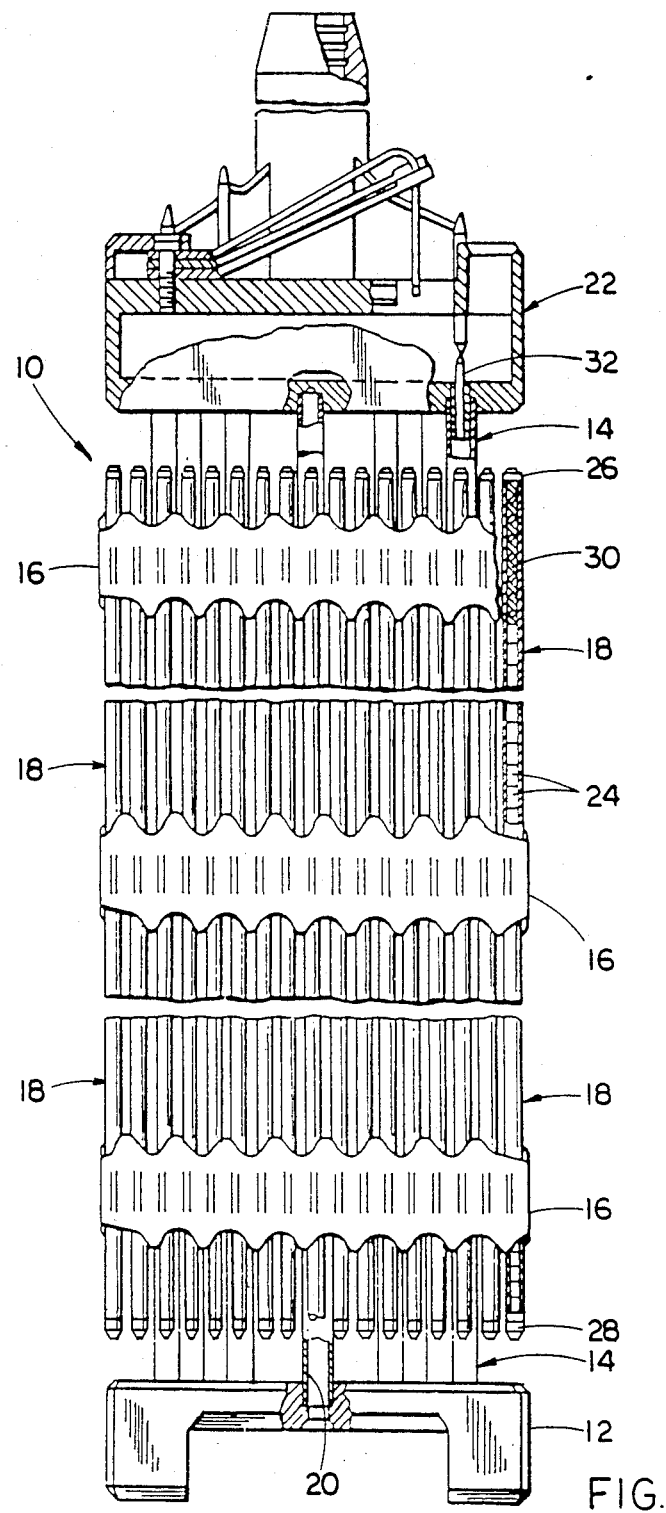
FIG. 1 is an elevational view, partly sectioned and broken away, of a fuel assembly which has had its fuel rods installed by a fuel rod loader having a gripper to which the present invention is applied.

Referring now to the drawings, and particularly to FIG. 1, there is shown an elevational view of a conventional nuclear reactor fuel assembly, represented in vertically foreshortened form and generally designated by the numeral 10. Being the type use in a pressurized water nuclear reactor (PWR), the fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14. With such an arrangement of parts, the fuel assembly 10 forms an integral unit capable of being conventionally handled without damaging the assembly parts.

Figure 2:
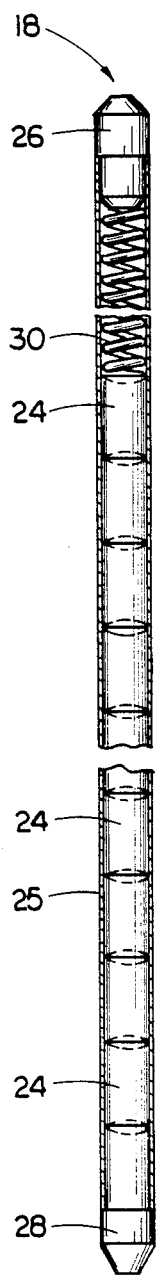
FIG. 2 is an enlarged longitudinal view of one of the fuel rods removed from the fuel assembly of FIG. 1, showing the fuel rod in vertically foreshortened and partly sectioned form.

As mentioned above, the fuel rods 18 in the array thereof in the assembly 10 are held in spaced relationship with one another by the grids 16 spaced along the fuel assembly length. As seen in FIG. 1 and in greater detail in FIG. 2, each fuel rod 18 includes a plurality of nuclear fuel pellets 24 disposed in a stack in an elongated hollow cladding tube 25 having its opposite ends closed by upper and lower end plugs 26,28 so as to hermetically seal the rod. Commonly, a plenum spring 30 is disposed within the cladding tube 25 between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work. To control the fission process, a number of control rods 32 are reciprocally movable in the guide thimbles 14 located at predetermined positions in the fuel assembly 10.

Fuel Rod Loading Operation

Figure 3:
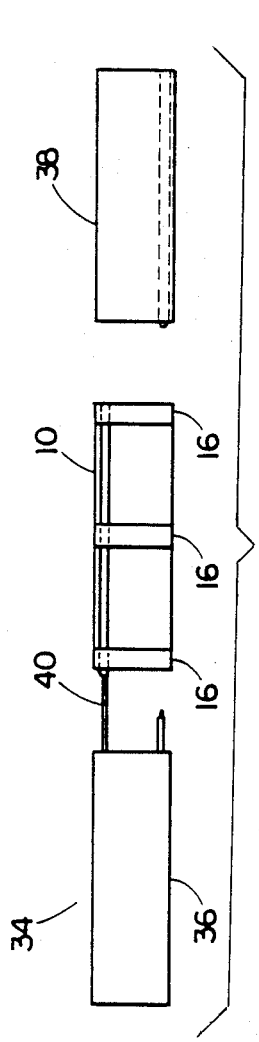
FIG. 3 is a schematic representation of a fuel rod loader and a fuel rod magazine disposed respectively adjacent bottom and top ends of a fuel assembly for effecting loading of fuel rods into the fuel assembly by pulling them from the magazine into the top of the fuel assembly and toward the bottom thereof by the gripper of the rod loader.

Turning now to FIGS. 3, there is seen the fuel rod storage and loading equipment, generally designated 34, which is currently used for loading fuel rods 18 into the fuel assembly by pulling them from the bottom of the assembly, through the assembly, to top thereof. The equipment 34 includes a fuel rod loader 36 and a fuel rod magazine 38. The loader 36 has an extendible and retractable gripper 40. When the fuel assembly 10 under construction is located between the loader 36 and magazine 38, with the loader at the bottom of the assembly and the magazine at the top thereof, the gripper 40 is extended longitudinally outward from the loader, through the fuel assembly grids 16, and to the fuel rod magazine. There, the rod gripper 40 is brought into coupling engagement with the lower end plug 28 of one of the fuel rods 18 stored in the magazine 38 and then is longitudinally retracted or withdrawn back through the fuel assembly 10, pulling the fuel rod 18 from the magazine 38 into and through the grids 16 of the fuel assembly 10.

Figure 4:
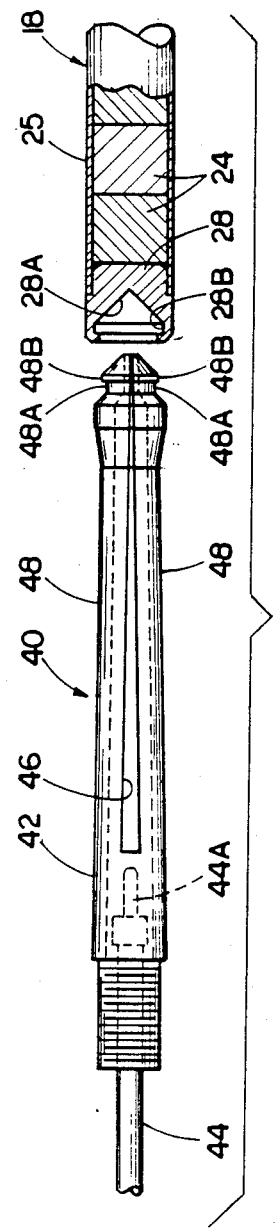
FIG. 4 is an enlarged side elevational view of the gripper of the fuel rod loader of FIG. 3, illustrating the fingers of the gripper in a collapsed condition prior to insertion of the end portion of the gripper into an end plug on the lower end of a fuel rod, such as seen in FIG. 2.
Figure 5:
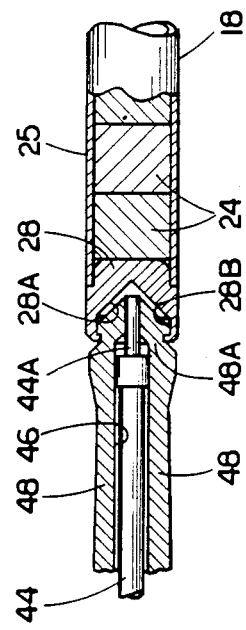
FIG. 5 is a fragmentary side elevational view of the gripper similar to FIG. 4, but showing the fingers of the gripper in an expanded condition after insertion of the end portion of the gripper into and coupling with the fuel rod end plug.
Figure 6:
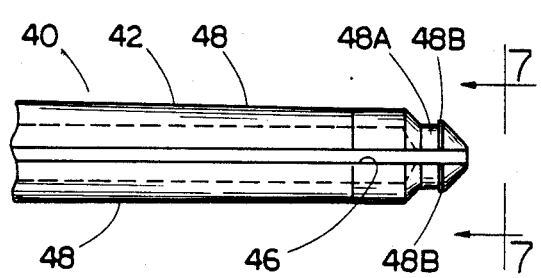
FIG. 6 is a fragmentary side elevational view of the gripper of FIG. 4, illustrating its fingers in the expanded condition.
Figure 7:
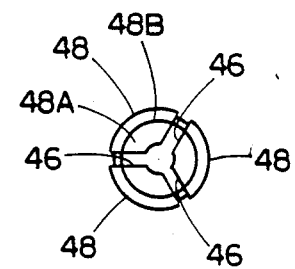
FIG. 7 is an end view of the gripper as seen along line 7—7 of FIG. 6.

Referring to FIGS. 4–7, the fuel rod gripper 40 has an outer tube 42 and an inner mandrel or shaft 44. The outer tube 42 has a plurality of longitudinal slots 46 open at the forward end of the tube 42 and defining a plurality of ligaments or fingers 48 therebetween. Each finger 48 has a forward end portion 48A with a generally outwardly-projecting arcuate rim portions 48B thereon. When the fingers 48 are in a relaxed, unstressed or collapsed condition as seen in FIG. 4, the rim portions 48B taken together define a generally circular and circumferential rim which is longitudinally insertable into a cavity 28A of the lower end plug 28 of the fuel rod 18.

The inner shaft 44 of the rod gripper 40 is insertable in the outer tube 42. The inner shaft 44 includes a terminus portion 44A. Upon insertion of the inner shaft 44 forwardly and longitudinally through the outer tube 42 from the position shown in FIG. 4 to the position shown in FIG. 5, the inner shaft terminus portion 44A internally engages the forward end portions 48A of the inwardly-biased fingers 48 of the outer tube 42 causing them to radially spread apart to an expanded condition. This opens the rim portions 48B causing them to releasably engage an internal circumferential groove 28B in the cavity 28A of the fuel rod lower end plug 28. Thus engaged, the rod gripper 40 can be retracted or withdrawn by the fuel rod loader 36 to pull the fuel rod 18 into the fuel assembly 10. Thereafter, withdrawing the inner shaft 44 rearwardly and longitudinally through the outer tube 42 from the position shown in FIG. 5 to the position shown in FIG. 4 permits the forward end portions 48A of the fingers 48 to radially retract or return to the collapsed condition such that they can be removed from the cavity 28A of the fuel rod lower end plug 28.

Fuel Rod Gripper End Cap

The forward end portions 48A of the fingers 48 rearwardly of the rim portions 48B have a generally cylindrical shape and forwardly of the rim portions 48B have a conical shape defining a blunt configuration on the leading end of the gripper 40. Occasionally, when the fuel rod gripper 40 is initially passed through the fuel assembly 10 before coupling with the fuel rod 18, the leading end portions 48A of the gripper fingers 48 impact one or more of the dimples (not shown) on the grid(s) 16 which extend into the grid cells through which the fuel rod will be placed. The force of the impact due to the blunt configuration of the gripper finger end portions 48A can be sufficient to cause deformation or cocking of the impacted dimple such that the dimple will not have the desired positional and supporting relationship to the fuel rod once the latter is loaded through the particular grid cell.

Figure 8:
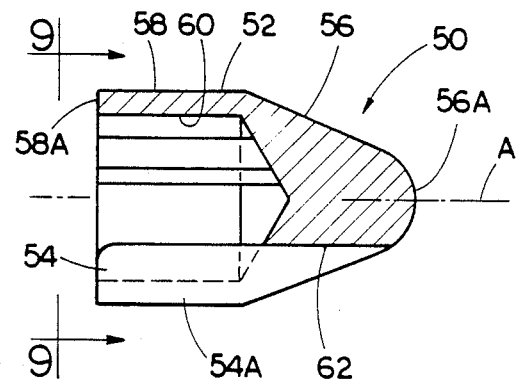
FIG. 8 is an enlarged longitudinal axial sectional view of an end cap for the gripper end portion in accordance with the present invention.
Figure 9:
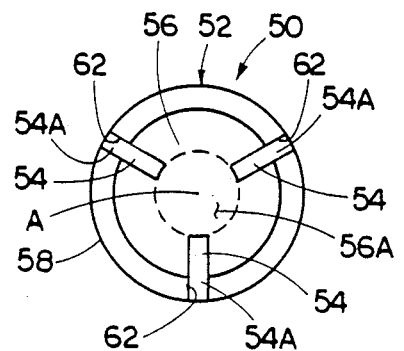
FIG. 9 is an end view of the end cap as seen along line 9—9 of FIG. 8.
Figure 10:
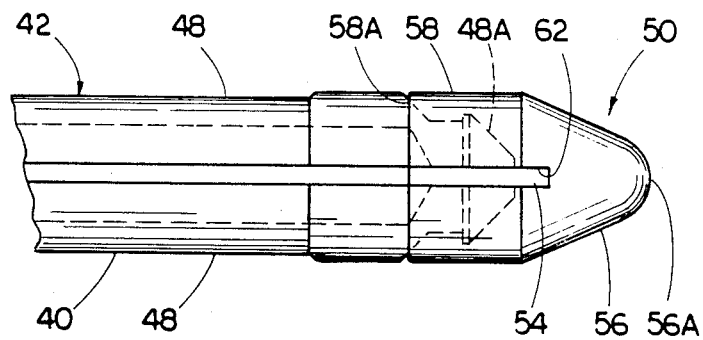
FIG. 10 is a view similar to that of FIG. 6, but on an enlarged scale and illustrating the gripper with the end cap of FIG. 9 installed thereon.

Referring now to FIGS. 8-10, there is illustrated an end cap 50 for shielding or covering the blunt end portions 48A of the fuel rod gripper fingers 48 during the initial insertion of the gripper 40 through the cells of the grids 16. Once the gripper 40 has been inserted through the grid cells, the end cap 50 is then removed for coupling of the finger end portions 48A to the fuel rod end plug 28 in preparation for pulling the fuel rod 18 into the fuel assembly 10 as described above.

More particularly, the end cap 50 includes a body 52 and a plurality of internal flutes 54. The body 52 of the end cap 58 has a longitudinal axis A and a forward camming portion 56 and a rearward hollow mounting portion 58 disposed in tandem relation along the axis A. The forward portion 56 of the body 52 is solid and has a shallow tapered configuration with a rounded front end or nose 56A providing a surface for engaging with minimal impact and camming past the grid dimples and springs as the gripper 40 is inserted through the fuel assembly 10. The rearward mounting portion 58 has a cylindrical configuration and a central counterbore 60 formed therein closed at its forward end and open at its rear end. At its rear end, the mounting portion 58 is inserted on the gripper 40 so as to fit over and cover the end portions 48A of the gripper fingers 48 with the forward camming portion 56 extending forwardly thereof. As seen in FIG. 10, a rear shoulder 58A formed on the body mounting portion 58 abuts an annular external surface portion of the gripper fingers end portions 48A when the end cap 50 is fully installed on the gripper 40.

The internal flutes 54 of the end cap 50 are spaced circumferentially from one another and each extend in longitudinal relation internally of the hollow mounting portion 58 of end cap body 52. More particularly, the end cap body 52 has a plurality of channels 62 formed in the forward and rearward portions 56,58 thereof and spaced circumferentially from one another and extending longitudinally therealong. The channels 62 are open at their rear ends and closed at their front ends. The flutes 54 snugly fit in the channels 62 therein at outer edges 54A and are affixed to the body portion 56, 58, such as by soldering thereto.

In such rigidly mounted arrangement within the counterbore 60 of the body mounting portion 58, the flutes 54 project radially inwardly toward the longitudinal axis A but terminate short thereof to allow clearance for insertion of the terminus portion 44A of the inner shaft 44 for expanding the fingers 48 of the outer tube 42 of the gripper 40. The flutes 54 are spaced apart approximately 120 degrees from one another, the same angular distance as the gripper slots 46. Each of the flutes 54 has a substantially planar configuration and releasably fits within one of the respective slots 46 of the gripper 40 when the finger end portions 48A thereof are placed in the expanded condition by insertion of the gripper inner shaft 44, as described earlier.

Then, upon withdrawal of the inner shaft 44, the finger end portions 48A are permitted to retract to the collapsed condition and grip the flutes 54 so as to retain them in the slots 46 and retain the end cap 50 on the gripper 40. Because the flutes 54 of the end cap 50 and the slots 46 of the gripper 40 are angularly displaced 120 degrees, the end cap 50 tends to center itself on the gripper 40 as force is applied to the flutes 54 by the collapsing fingers 48. To remove the end cap 50, the inner shaft 44 of the gripper 40 is again inserted to expand the fingers 48 sufficiently apart to allow release of the flutes 54 from the slots 46.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely an exemplary embodiment thereof.

We claim:

1. In combination with a fuel rod gripper having a plurality of circumferentially-spaced and longitudinally extending slots defining a plurality of gripping fingers with end portions radially expandable and retractable between corresponding expanded and collapsed conditions, an end cap comprising:
   (a) a body having a forward camming portion and a rearward hollow mounting portion, said mounting portion being configured to fit over and cover the end portions of the gripper fingers with said forward camming portion extending forwardly thereof; and
   (b) a plurality of circumferentially-spaced and longitudinally-extending attachment flutes disposed internally of said hollow mounting portion of said body and projecting radially inwardly therefrom, said flutes being configured to releasably fit within the respective slots of the gripper when the finger end portions thereof are in the expanded condition and to be retained therein when the finger end portions are in the retracted condition.

2. The end cap as recited in claim 1, wherein said forward portion has a tapered configuration with rounded front end.

3. The end cap as recited in claim 1, wherein said rearward portion has a cylindrical configuration.

4. The end cap as recited in claim 1, wherein said body has a longitudinal axis and said forward camming portion and rearward mounting portion are disposed in tandem relation along said axis.

5. The end cap as recited in claim 1, wherein said forward portion is solid.

6. The end cap as recited in claim 1, wherein said rearward mounting portion has a central counterbore formed therein being closed at its forward end and open at its rear end.

7. The end cap as recited in claim 1, wherein said flutes are disposed approximately 120 degrees from one another.

8. The end cap as recited in claim 1, wherein at least said hollow mounting portion of said body has a plurality of circumferentially-spaced and longitudinally extending channels formed therein, said flutes being attachedly mounted at their outer edges in said respective channels thereof.

* * * * *